W. W. GRIER & R. H. BOYD.
COAL MACHINE FOR MINING.

No. 50,577. Patented Oct. 24, 1865.

Witnesses
P. T. Dodge
C. H. Fowler

Inventor
W. W. Grier
R. H. Boyd
By their Atty.
W. E. Dodge

UNITED STATES PATENT OFFICE.

W. W. GRIER AND R. H. BOYD, OF HULTON, PENNSYLVANIA.

IMPROVED COAL-MACHINE FOR MINING.

Specification forming part of Letters Patent No. 50,577, dated October 24, 1865.

*To all whom it may concern:*

Be it known that we, W. W. GRIER and R. H. BOYD, of Hulton, in the county of Allegheny and State of Pennsylvania, have invented certain new and useful Improvements in Machines for Mining Coal; and we do hereby declare that the following is a full, clear, and exact description thereof, reference being had to the accompanying drawings and the letters of reference marked thereon, making part of this specification, in which—

Figure 1:
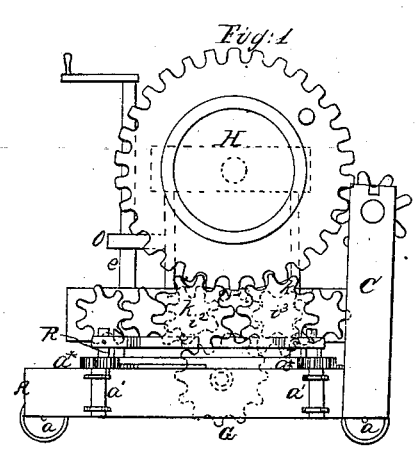
Figure 2:
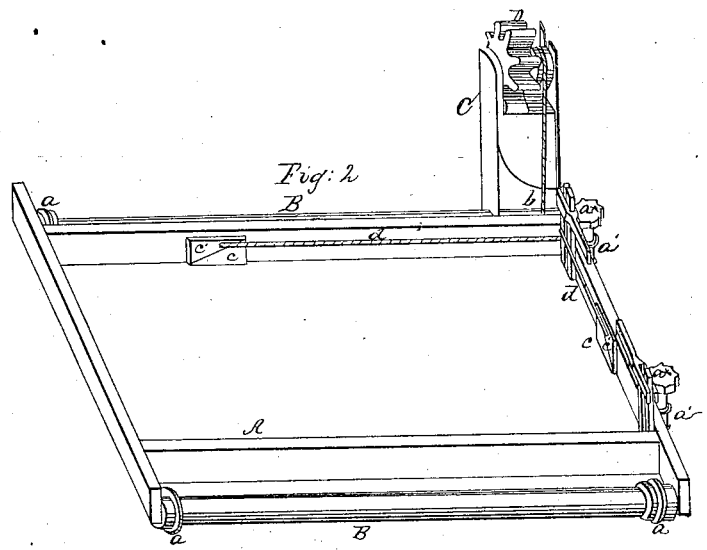
Figure 3:
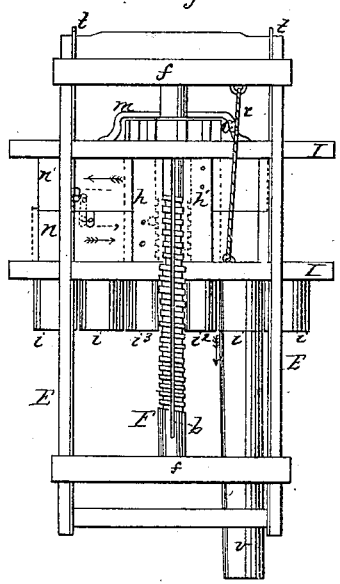
Figure 4:
Figure 5:
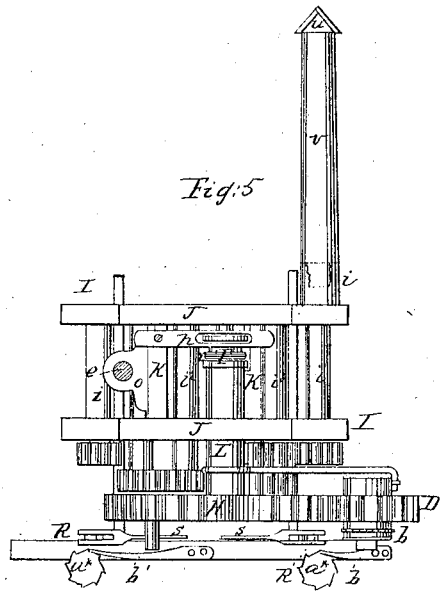
Figure 6:
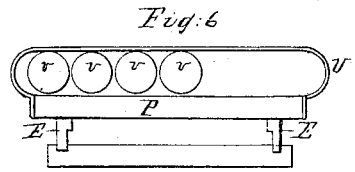

Figure 1 is a rear elevation; Fig. 2, a perspective view of the frame on which the machine is mounted; Fig. 3, a plan view, looking from below; Fig. 4, a view of one of the gear-wheels detached. Fig. 5 is a top-plan view of the machine detached from its frame, and Fig. 6 is a front-end view of the frame and the bit-stems with their rests.

The nature of our invention consists in a novel arrangement of mechanism for operating a series of bits or boring-tools for cutting or mining coal, and in a novel method of mounting, adjusting, and operating the same.

To enable others skilled in the art to construct and use the same, we will proceed to describe it.

A represents the frame, which is mounted on the flanged wheels $a$, attached to the shafts B, one of said shafts being attached at each side of the frame A, as clearly shown in Fig. 2.

A swinging frame, C, is attached to one of the shafts B at one end of the frame A, and in the upper portion of said frame C is mounted a gear-wheel, D, having a pulley secured to it, around which and the shaft B a cord or chain, $b$, passes. When the frame C is swung into a vertical position, as shown in Fig. 2, the wheel D is thrown into gear with the main driving-wheel H, by which motion is transmitted to the truck-wheels $a$, thereby moving the machine to the right or left, according as the wheel H may be made to rotate in one or the other direction, it being understood that the truck-wheels $a$ run upon tram-rails laid for that purpose.

On the inner sides of the frame A, both at the sides and also at one end are secured the inclined blocks $c$, and resting thereon are corresponding wedge-shaped blocks $c'$, these blocks being provided with a tongue and groove to keep them in place and prevent the blocks $c'$ from slipping off.

Attached to the sliding blocks $c'$ are cords $d$, which pass around and are wound upon the shafts $a'$, to the upper end of which ratchet-wheels $a^*$ are secured, and which are held in place by the pawls $b'$. (See Fig. 5.)

The frame E, upon which the working mechanism is mounted, is made of such a size as to fit within the frame A and rest upon the blocks $c'$. It is obvious that by this arrangement the frame E, with its mechanism, can be raised at pleasure by simply turning the shafts $a'$, which will wind up the cords $d$, and thus draw the wedges $c'$ up the inclined faces of the stationary blocks $c$. Another frame, consisting of the cross-bars I I, uprights K K, and upper cross-bars, J J, is provided for supporting the operating mechanism, and this latter frame is so mounted on the frame E that it, with its mechanism, can be moved to and fro thereon longitudinally of said frame E. In the upper bars, J J, of this movable frame the shaft L of the driving-wheel H has its bearings, and below it, in the lower cross-bars, I I, are mounted a series of rotating shafts or spindles having gear-wheels attached to their rear ends, and so arranged as to be operated by the wheel H, as shown in Fig. 1, the front ends of these shafts being shown by $i\ i$, &c., of Fig. 3, and their main portion being shown in Fig. 5.

The manner of arranging this gearing is as follows: The shafts $i^2$ and $i^3$ are provided with a gear-wheel, $k$, so arranged as to engage with the driving-wheel H, and in front of the wheels $k$, on the same shaft, are mounted similar wheels, of less diameter, as shown in dotted lines in Fig. 1. These latter wheels gear into and drive similar wheels attached to the adjoining shafts $i$, the right-hand shaft, $i^3$, driving a shaft, $i$, both on its right and left, while the left-hand shaft, $i^2$, only drives the shafts $i\ i$ on its left, the reason for which arrangement being that thus each series of three drills is driven direct from the main wheel H independent of each other. It is obvious that this precise arrangement of gearing need not be strictly adhered to in all cases. Nor do we wish to be understood as confining ourselves to the construction of the movable frame here in described, it being obvious that any construction and arrangement that shall furnish the necessary support or bearings for the mechanism and bring the parts in their requisite relative positions will answer the purpose.

A screw-shaft, F, is mounted in the frame E, longitudinally thereof, and underneath the movable frame, said shaft F being clearly shown in Fig. 3. A gear-wheel, G, (shown detached in Fig. 4,) is mounted loosely on the shaft F, this wheel G being provided with a key or feather, $e'$, which fits into a groove, $l$, cut in shaft F, whereby the wheel G is prevented from turning loosely on said shaft. By this arrangement it will be seen that when motion is applied to wheel G it and the shaft F will be caused to rotate together, the wheel G being at the same time left free to move forward or backward on said shaft. The wheel G turns freely within the collar or frame $m$, which secures or keeps it in close contact with the cross-bar I of the movable frame, while at the same time not interfering with its rotation.

Resting on the frame E are two movable cross-bars, $n\ n'$. To the bar $n$, on one side of shaft F, is secured the one half, $h$, of an open nut, having an internal screw-thread to correspond with that on shaft F. To the other bar, $n'$, is attached the corresponding half, $h'$, of said nut. Now, it will be seen that by moving the bars $n$ and $n'$ in the directions indicated by the black arrows the two halves of the nut will be made to close upon the shaft F, and that consequently, if the shaft F be rotated in one direction, the nut, and with it the movable frame, to which it is attached by means of the bars $n\ n'$, will be moved forward, and that by reversing the motion of shaft F the nut and movable frame will be moved backward. By moving the bars $n$ and $n'$ in the direction indicated by the red arrows the nut will be unloosened from the shaft F, when the nut and movable frame can be moved by other means and independently of shaft F, whether the latter be rotating in one or the other direction, or even if it be stationary. The nut is opened or closed at pleasure by means of the shaft $e$, which has its upper bearing in the bracket $o$, secured to the upright K, its lower end being forked, and having one prong working in a slot in bar $n$, and the opposite prong working in a similar slot in bar $n'$, as shown in Fig. 3.

A crank or other suitable means should be supplied for operating the shaft $e$.

The wheel G is driven by a pinion on shaft $i^3$, which pinion is located in front of wheel $k$ on said shaft. As the wheel G is thus rotated the screw-shaft F is also caused to rotate by means of the feather $e'$, working in the slot $l$, as previously described, and it is obvious that if the nut be closed on the shaft F while the latter is thus made to rotate, the nut will be fed or moved along said shaft, and will carry the movable frame and operating mechanism forward with it. It is by this means that we provide for feeding the series of cutting or boring bits (secured to the front end of shafts $i\ i$, &c.) into the coal-bank, as they cut away the coal by their rotation.

Upon the front portion of shaft L is mounted a drum or collar, T, so arranged that when shoved back by lever $p$, as shown in Fig. 5, it will engage with a clutch or key on shaft L, and be made to rotate therewith. A cord, $r$, attached to the rear cross-bar, $f$, of frame E, (see Fig. 3,) extends forward and passes over a pulley or eye secured to the front bar, I, of the movable frame, from whence it passes up and has its other end attached to the collar T. It will thus be seen that when the nut is unloosed from shaft F and the collar T is thrown into connection with the shaft L the cord $r$ will be wound upon the collar, and thereby draw the frame, with it series of bits, &c., back, after which the machine can be moved along, ready for another cut.

At the rear end of the main frame A are secured two slotted standards, R, one near each end of the cross-bar of said frame, as shown in Figs. 1, 2, and 5. The projecting ends $t$ of the frame E, Fig. 3, fits into the slots in the standards R. A clamping-lever, $s$, pivoted to one arm of the standard R, is then turned down so as to embrace the other arm of said standard and press them together, thereby holding the frame E steady and firm in its place while the bits are being operated, these parts being clearly shown in Figs. 1, 2, and 5.

Upon the front end of frame E is located a cross-bar, P, which serves as a rest to support and steady the bits and their stems while boring, as shown in Fig. 6. A metal bar, U, is attached at each end to the cross-bar P, as shown in Fig. 6, which serves to hold the bits from bending or being raised up, and thus the bars P and U form a guide to steady and direct the bits while boring.

The bits $w$, which cut the coal, are screwed or otherwise fastened into the end of a rod, $v$, which latter is, in turn, secured to the front end of the shafts $i\ i$, as shown in Fig. 5. By this method of attaching the bits we are enabled to dispense with the long twisted stem shown in our former patent, whereby we greatly cheapen the manufacture of the bits, and in case one becomes broken or injured it can be readily removed by detaching the bit from the stem $v$; or, if it is embedded in the coal, the bit, with the stem $v$, can be detached from the shaft $i$ by simply moving the movable frame back a few inches.

It will be understood that we propose to use with this machine the bit already patented to us, and that the machine is to be operated by steam or compressed air, the same as in the case of our machine patented July 12, 1864.

In transporting our machine in and out of the pit or mine we mount or load it upon a low truck-car provided for that purpose. When it has arrived at the point where it is intended to be used it is removed from the truck and placed on the movable rail or tram way laid parallel with the face of the vein that is to be cut or mined. When the vein has been mined or cut entirely across, and the loosened coal removed, the track is moved forward near the face of the vein, and the operation repeated, as before.

Having thus fully described our invention, what we claim is—

1. The screw-shaft F, provided with the groove $l$, in combination with the gear-wheel G, provided with the feather $e'$, arranged and operating in connection with the movable frame, as and for the purpose herein set forth.

2. The drum T, mounted on shaft L, and cord $r$, arranged to operate the movable frame, as shown and described.

3. The wedge-shaped blocks $c'$, in combination with the stationary blocks $c$, arranged to operate substantially as shown, for the purpose of adjusting the frame E.

4. The slotted standard R, in combination with the cam-levers $s$ or their equivalents, for the purpose of holding the frame E, as shown and described.

5. The arrangement of gearing, as shown, by which each series of three drills is operated independent of the others.

6. Attaching the bits to the detachable stem or mandrel $v$, as shown and described.

7. Supporting the bits by means of the guide-bars P and U, arranged as shown and described.

8. The swinging frame C, provided with the gear-wheel D, arranged to operate in combination with the operating mechanism, and the truck-wheels $a$, for the purpose of moving the machine, as herein set forth.

W. W. GRIER.
R. H. BOYD.

Witnesses:
A. S. NICHOLSON,
JOHN N. McCLOURY.